United States Patent Office 3,546,215
Patented Dec. 8, 1970

3,546,215
6-GEM-DIFLUORO STEROIDS
John H. Fried, Palo Alto, Calif., assignor to Syntex Corporation, Panama, Panama, a corporation of Panama
No Drawing. Continuation-in-part of application Ser. No. 676,060, Oct. 18, 1967. This application Sept. 30, 1968, Ser. No. 763,918
Int. Cl. C07c *173/00*
U.S. Cl. 260—239.55                    23 Claims

ABSTRACT OF THE DISCLOSURE

6α,6β-difluoropregn-4-en-3-ones (substituted at C–11 with hydroxy or chloro, at C–21 with hydroxy, fluoro, chloro or the hydroxy esters thereof, optionally substituted at C–9 with chloro or fluoro, at C–16 with methyl, at C–17 with hydroxy or the esters thereof, optionally, C–16 and C–17 are bridged by a cyclic acetal or ketal, optionally there is a double bond between C–1,2), exhibit antiinflammatory and glucocorticoid activity.

---

This application is a continuation-in-part of my copending application No. 676,060, filed Oct. 18, 1967, now abandoned.

The present invention relates to novel gem-difluoro steroid derivatives and to novel processes for the preparation thereof.

More particularly, the present invention relates to the novel 6α,6β-difluoro steroids of the following formula:

$$\text{(I)}$$

[Structural formula of steroid with substituents $CH_2R^1$, $C=O$, $R^2$, $R^3$, $R^6$, Z, X, F, F, O=]

wherein:

$R_1$ is hydroxy, fluoro, chloro or a conventional hydrolyzable ester;

$R^2$ is hydrogen, hydroxy, or a conventional hydrolyzable ester;

$R^3$ is hydrogen or methyl;

$R^2$ and $R^3$ when taken together are the group $$\begin{array}{c} \cdots O \diagdown \\ \phantom{\cdots O}C \\ \cdots O \diagup \phantom{C} \diagdown R^5 \end{array} \begin{array}{c} R^4 \\ \phantom{C} \end{array}$$

where each of $R^4$ and $R^5$ is, independently of each other, hydrogen, lower alkyl, halogenated lower alkyl, monocyclic cycloalkyl, monocyclic cycloalkyl lower alkyl, monocyclic aryl, monocyclic aryl lower alkyl, monocyclic heterocyclic, or monocyclic heterocyclic lower alkyl; or $R^4$ and $R^5$ taken together with the carbon atom to which they are joined are monocyclic cycloalkylidene or monocyclic heterocyclic ylidene;

$R^6$ is hydroxy or chloro;

X is hydrogen, fluoro or chloro, provided that each of $R^6$ and X is chloro when $R^6$ is chloro; and Z is a carbon-carbon single bond or a carbon-carbon double bond.

The wavy line at the C–16 position indicates that the $R^3$ substituent can be either in the α- or β-configuration.

Included within the present invention are 6-gem-difluoro steroids optionally substituted at the C–9α position with fluoro or chloro; at the C–11β position with hydroxy or chloro, provided that each of the C–9α and C–11β positions are substituted with chloro only when both positions are simultaneously substituted with chloro; at the C–16α or C–16β positions with methyl; at the C–17α position with hydroxy or an ester thereof; or at the C–21 position with fluoro, chloro, hydroxy or an ester thereof. The present novel 6-gem-difluoro steroids are also optionally substituted with an acetal or ketal group bridging the 16α,17α-positions.

The novel 6-gem-difluoro steroids of the present invention are valuable medicinal steroids possessing antiinflammatory and glucocorticoid activity. Accordingly, the present compounds are useful in the treatment of allergic diseases, collagen diseases, skin diseases, and the like. These novel steroids are administered via conventional pharmaceutical routes, such as orally, parenterally, topically, and the like.

The present compounds are administered in the usual pharmaceutically acceptable forms. For example, the present compounds are administered orally as solids in the form of pills, tablets, powders (free or encapsulated), and the like; or as liquids in the form of solutions, suspensions, syrups, and the like; the present compounds are usually administered parenterally as liquids in suspensions or solutions. The dosage for oral or parenteral administration is from about 0.001 mg. to about 1 mg. per kilogram of body weight per day. Topically, the present compounds are administered as powders, creams, ointments, solutions, suspensions, aerosoles, foams, and the like, containing about 0.001% to about 1% of the steroid, with the remainder being a pharmaceutically-acceptable inert vehicle or combinations of inert vehicles.

Orally, parenterally and topically, the present novel 6-gem-difluoro steroids are administered alone or in combination with one or more pharmaceutically-accepted therapeutic agents, such as antibiotics.

The term "lower alkyl" denotes a group comprising a straight or branch chain aliphatic hydrocarbon of from 1 to 6 carbon atoms. Typical lower alkyl groups include methyl, ethyl, isopropyl, butyl, hexyl, and the like. The term "halogenated lower alkyl" denotes a lower alkyl substituted with one or more halo atoms, preferably fluoro or chloro.

The term "monocyclic cycloalkyl" denotes a group comprising a cyclic hydrocarbon of 5 to 6 carbon atoms, i.e. cyclopentyl and cyclohexyl. The term "monocyclic cycloalkyl lower alkyl" denotes a lower alkyl group substituted with one cycloalkyl substituent.

The term "monocyclic aryl" denotes a phenyl group optionally substituted with 1 to 3 lower alkyl, hydroxy, fluoro, chloro or lower alkyloxy groups.

The terms "monocyclic heterocyclic" and "monocyclic heterocyclic ylidene" denote ring molecules of 5 to 6 carbon atoms containing 1 or 2 oxygen, nitrogen or sulfur atoms in the ring. Typical monocyclic heterocyclics include furan, morpholine, pyrrolidine, and the like. Typical monocyclic heterocyclic ylidenes include tetrahydrofuranylidene, pyridylidene, 1-thia-1-oxide-4,4-cyclohexylidene and the like.

The terms "monocyclic aryl lower alkyl" and "monocyclic heterocyclic lower alkyl" denote lower alkyl of from 1 to 6 carbon atoms substituted with a monocyclic aryl or monocyclic heterocyclic group.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are formate, acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2 - chloro - 4 - nitrobenzoate, aminoacetate, diethylaminoacetate, piperidinoacetate, $\beta$-chloropropionate, trichloroacetate, $\beta$-chlorobutyrate, dihydrogen phosphate, dibenzyl phosphate, benzyl hydrogen phosphate, sodium benzyl phosphate, cyclohexylammonium benzylphosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The novel gem-difluoro compounds of the present invention are prepared from the corresponding 6-fluoro compounds. The novel process of the present invention can be illustrated by the following reaction sequence:

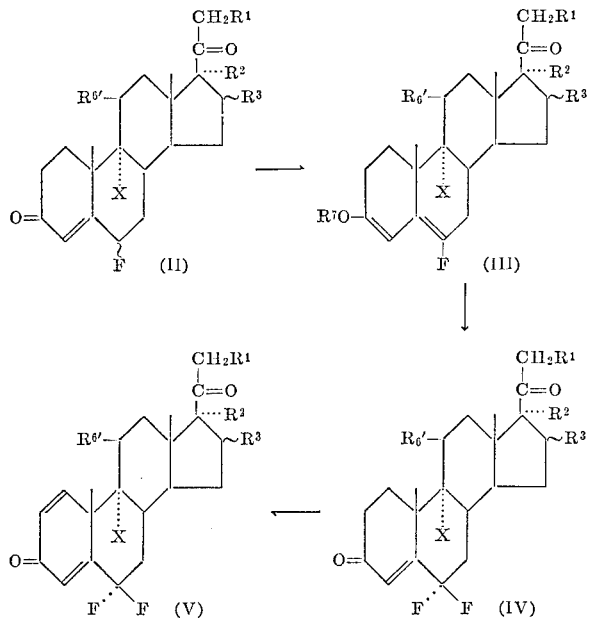

wherein:

$R^1$, $R^2$, $R^3$ and X are as defined hereinbefore;
$R^{6'}$ is hydrogen, hydroxy or chloro;
$R^7$ is lower alkyl, preferably methyl or ethyl; and the wavy line at the C–16 position indicates that the $R^3$ substituent can be the $\alpha$- or $\beta$-configuration.

The present novel 6-gem-difluoro steroids, the compounds of Formula I (the compounds of Formulas IV and V wherein $R^{6'}$ is hydroxy or chloro) can be prepared from 6-fluoro steroids, the compounds of Formula II, in three or four steps. First step, the 3-alkoxy-$\Delta^{3,5}$-6-fluoro steroids, the compounds of Formula III, are prepared from the corresponding 6-fluoro starting steroids, the compounds of Formula II. Second step, the novel 6-gem-difluoro steroids, the compounds of Formula IV, are prepared from the corresponding compounds of Formula III by the novel process of the present invention. Third step, the novel $\Delta^{1,4}$-6-gem-difluoro steroids, the compounds of Formula V, are in turn prepared from the corresponding novel compounds of Formula IV.

When $R^{6'}$ is hydrogen, a fourth step is required; the introduction of an 11$\beta$-hydroxy group or an 11$\beta$-chloro group onto the compounds of Formulas IV and V to finish the 11$\beta$-hydroxy compounds and the 11$\beta$-chloro compounds of Formula I.

The compounds of Formula III, the 3-enol ethers of the 6-fluoro starting steroids of Formula II, are prepared from the compounds of Formula II by conventional techniques known to the art. For example, the compounds of Formula II are treated with an alkyl orthoformate, preferably methyl orthoformate or ethylorthoformate, in the presence of an acid catalyst, such as sulfuric acid, p-toluenesulfonic acid, and the like, in an inert non-aqueous, preferably anhydrous, organic solvent to afford the compounds of Formula III.

The compounds of Formula III are then isolated by conventional techniques; for example, the reaction mixture is neutralized and water is added to solidify the enol ether derivatives. The solid is then collected by filtration.

The compounds of Formula III are then treated with perchloryl fluoride in an inert, non-aqueous, preferably anhydrous aprotic organic solvent, as for example, a N,N-dialkyl hydrocarbon carboxylic amide, such as dimethylformamide, dimethylacetamide, and the like, to furnish the novel compounds of Formula IV. The reaction is conducted at temperatures in the range of from about 0° C. to about 100° C., conveniently at room temperature. At least a molar equivalent of perchloryl fluoride is used per molar equivalent of the compound of Formula III, and generally two or more molar equivalents of perchloryl fluoride are utilized.

The novel 6-gem-difluoro steroids, the compounds of Formula IV, are isolated by conventional techniques. For example, the reaction mixture is cautiously neutralized with an aqueous basic solution and the novel product is crystallized by the addition of water. The solid product is collected by filtration. The product can then be purified by dissolving in an inert organic solvent, immiscible with water, as for example, a halogenated hydrocarbon, such as methylchloride, or a water-immiscible ether, such as diethylether; washing with water to neutrality, drying and evaporating to dryness. The product can be further purified by recrystallization, chromatography, and the like. The novel compounds of Formula IV where $R^{6'}$ is hydroxy or chloro, are the novel 6-gem-difluoro steroids of Formula I wherein Z is a carbon-carbon single bond.

The 6-fluoro group of the 6-fluoro starting steroid of Formula II is either in the alpha or beta configuration. The present process is operable with starting steroids possessing either the 6$\alpha$- or 6$\beta$-fluoro configuration.

The $\Delta^1$ unsaturation, the C–1,2 double bond, is introduced into the novel compounds of Formula IV by conventional techniques to furnish the novel $\Delta^{1,4}$ compounds of Formula V. For example, the novel compounds of Formula IV can be refluxed with selenium dioxide in the presence of t-butynol and pyridine, or refluxed with selenium dioxide and chlorobenzene, or refluxed with 2,3-dichloro-5,6-dicyano-1,4-benzoquinone to afford the compounds of Formula V. The compounds of Formula V, wherein $R^{6'}$ is hydroxy or chloro, are the novel 6-gem-difluoro steroids of Formula I, wherein Z is a carbon-carbon double bond.

The compounds of Formula V are isolated by conventional techniques. For example, the reaction mixture may be evaporated to dryness, the residue taken up in an inert organic solvent immiscible with water, washed to neutrality, dried and evaporated to dryness. The compounds can be further purified by recrystallization, chromatography, and the like.

In the situation where the compounds of Formulas IV and V are unsubstituted at the C–11β position, the 11β-hydroxy group is introduced by incubating such compounds with excised adrenal glands or extracts thereof, or incubating with 11β-hydroxylating micro-organisms such as *Cunninghamella bainieri* or *Curvularia lunata*, in an appropriate nutrient media.

In the preferred embodiment of the above described process, $R^1$ is fluoro, chloro or a conventional hydrolyzable ester.

In the preferred embodiment of the present invention, 6-fluoro-9α,11β-dichloro starting steroids of Formula II are employed to prepare 6-gem-difluoro-9α,11β-dichloro steroids.

In the preferred embodiment of the present invention, the 17α-acyloxy-21-hydroxy configuration in the compounds of Formula I is introduced after the introduction of the 6-gem-difluoro moiety and the $\Delta^1$ unsaturation. Such configuration can be introduced by hydrolyzing the corresponding 17α,21 - (1' - methoxy)1',1' - alkylidenedioxy 6-gem-difluoro steroid derivatives with a mineral acid in a lower alkanol to afford the corresponding 17α-acyloxy-21-hydroxy 6-gem-difluoro steroid of Formulas IV or V. The 17α,21 - (1' - methoxy)1',1' - alkylidenedioxy 6-gem-difluoro steroid derivatives are prepared by treating 17α,21-dihydroxy 6-gem-difluoro steroid derivatives with the corresponding trimethyl alkylidynetrioxy in the presence of an acid catalyst.

The 6-fluoro starting steroids employed in the present process and used to prepare the present novel 6-gem-difluoro steroids are described in the literature and in United States and foreign patents. For example, see U.S. Pats. 2,983,737, 2,983,739, 3,053,838, 3,057,858, 3,124,251, 3,126,375, 3,201,391 and 3,248,389.

In addition, the 6-fluoro starting steroids can be prepared by conventional techniques well-known to the art from steroids of the following formula:

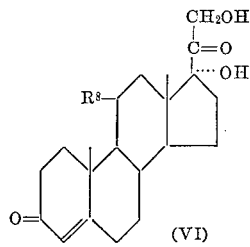

wherein $R^8$ is hydrogen or hydroxy.

For example, the 6-fluoro group is introduced by treating a 3-alkoxy-$\Delta^{3,5}$ steroid with perchloryl fluoride in dimethylformamide. The 9α-fluoro or -chloro group is introduced by treating a 9β,11β-oxido steroid with hydrogen fluoride or hydrogen chloride respectively in an inert, nonaqueous, preferably anhydrous, solvent or mixture of such solvents. The 9β,11β-oxido steroid is prepared from the corresponding $\Delta^{4,9(11)}$ steroid (which is prepared by treating the corresponding 11-hydroxy-$\Delta^4$ steroid with methane sulfonyl chloride in dimethylformamide in the presence of pyridine) by treating the latter with N-bromo acetamide and perchloric acid in dioxane or tetrahydrofuran, and then refluxing the resulting 9-bromo-11-hydroxy steroid with potassium acetate in acetone. The 9α,11β-dichloro groups are introduced by treating the corresponding $\Delta^{9(11)}$ steroid with chlorine gas in chloroform.

The 16-methyl group is introduced by treating the corresponding 20-keto-$\Delta^{16}$ steroid with methyl magnesium bromide in the presence of cuprous chloride in an ether such as tetrahydrofuran. The 20-keto-$\Delta^{16}$ steroid is prepared by preparing the 3,20-bis-semicarbazone of a 3,20-diketo-17α-hydroxy steroid, treating it with glacial acetic acid and acetic anhydride and then allowing the resulting product to react with aqueous pyruvic acid.

The 17α-hydroxy group is introduced in conjunction with the 16-methyl group by first treating the corresponding 16-methyl-$\Delta^{16}$ steroid (which is prepared by treating the corresponding $\Delta^{16}$ steroid with diazomethane and then heating the resulting product to 180° C.) with hydrogen peroxide, in an aqueous basic media, then permitting the resulting 16,17-oxido-16-methyl steroid to react with hydrogen bromide in glacial acetic acid. The resulting 16,17-bromohydrin is hydrogenated with the use of a palladium catalyst to afford the corresponding 16-methyl-17α-hydroxy derivative.

The 16α,17α-dihydroxy groups are introduced by treating a $\Delta^{16}$ steroid derivative with potassium permanganate, acetone and acetic acid. The 16α,17α-acetal or ketal groups are introduced by treating the corresponding 16α,17α-dihydroxy steroid in presence of perchloric acid with a lower alkanal, such as paraldehyde, propanal, and hexanal; halogenated lower alkanal, such as chloral hydrate trifluoroacetaldehyde hemiacetal and hapta fluorobutanal ethyl hemiacetal; a di(lower alkyl)ketone, such as acetone, diethylketone, dibutylketone, methylethylketone, and methylisobutylketone; a halogenated di(lower alkyl)ketone, such as 1,1,1-trifluoroacetone; a cycloalkanone, such as cyclopentanone, cyclohexanone, cyclobutanone, and cyclodexanone; mono- and dicycloalkyl ketone, such as cyclohexylmethyl ketone and dicyclopropyl ketone; a monocyclic aromatic aldehyde, such as benzaldehyde, halobenzaldehydes (e.g. p-chlorobenzaldehyde and p-fluorobenzaldehyde), lower alkoxy benzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), acylamidobenzaldehydes (e.g. N-acetylanthranilaldehyde), monocyclic aromatic lower alkanals, such as phenylacetaldehyde, α-phenylpropionaldehyde, β - phenylpropionaldehyde, γ - phenylbutyraldehyde, and aromatically-substituted halo, lower alkoxy, hydroxy, lower alkyl, acylamido and derivatives thereof; monocyclic heterocyclic aldehydes, such as picolinaldehydes, furfural, thiophene carbonals and halo, lower alkoxy, hydroxy, and lower alkyl derivatives thereof; a monocyclic heterocyclic lower alkanal such as oxacyclopen-4-yl acetaldehyde; a monocyclic aromatic lower alkyl ketone, such as acetophenone, propiophenone, butyrophenone, valerophenone, isocaprophenone, halophenyl lower alkyl ketones (e.g. p-chloroacetophenone, p-fluoroacetophenone, p-chloropropiophenone and p-fluoropropiophenone), (lower alkoxy) phenyl lower alkyl ketones (e.g. p-anisyl methyl ketone), di(lower alkoxy) phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), and acylamidophenyl lower alkyl ketones (e.g. acetylanilines), benzophenone, and mono or bis substituted fluoro or chloro, lower alkoxy, hydroxy, lower alkyl, acylamido derivatives thereof; a monocyclic aromatic lower alkanone, such a 1-phenyl-3-butanone and 1-phenyl-4-pentanone, and aromatically substituted derivatives thereof; monocyclic heterocyclic ketones, such as 2-acetylfuran, 2-benzoyl furan, and 2-acetylthiophene; monocyclic heterocyclic lower alkanones; and monocyclic heterocyclic ketones, such as alloxan.

The 21 chloro group is introduced by treating a 21-hydroxy steroid derivative with a molar triphenyl phosphine in carbon tetrachloride, optionally in the presence of dimethylformamide or dimethylacetamide, at about room temperature.

The 21 fluoro group is introduced by tosylating a 21-hydroxy steroid derivative with tolylsulfonyl chloride in pyridine, then refluxing the resulting 21-tolylsulfonate ester with sodium iodide in acetone to get the corresponding 21-iodo steroid derivative; and lastly refluxing the latter with potassium fluoride in ethylene glycol.

The 21- and 17α-hydroxy groups are etherified and esterified by conventional methods well-known to the art. For example, a 17α-hydroxy steroid is etherified by treating it with sodium hydride and then allowing it to react with an alkyl halide or the like. A 21-hydroxy steroid is esterified by treating it with an acid anhydride in pyridine.

Where $R^3$ is hydrogen in the derivatives of the compounds of Formula VI, the 11β-hydroxy group is introduced by incubating the compounds with excised adrenal glands or extracts thereof, or by incubating with 11β-hydroxylating micro-organisms such as *Cunninghamella bainieri* or *Curvularia Lunata* in a nutrient media.

The novel process is not limited to the aforementioned 6-fluoro steroid derivative of the pregnane series, but rather, the novel process can be conducted on any 3-alkoxy-$\Delta^{3,5}$-6-fluoro steroids to obtain the corresponding 6α,6β-difluoro steroids. Accordingly, 6-fluoro steroids of the androstane, estrane or pregnane series, and the like, can be employed. The reaction parameters described above are employed on all 6-fluoro starting steroids of any series.

The following examples are intended to further illustrate and typify the nature of this invention. These examples are presented solely for the purpose of exemplification, and they should not be construed as a limitation on the scope of this invention.

EXAMPLE 1

*Part A.*—To a suspension of 1 g. of 6α-fluoro-11β-hydroxy-16α,17α-isopropylidenedioxy - 21 - acetoxypregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is then added 0.8 ml. of pyridine, followed by water until solidification occurs. This solid is collected by filtration, washed with water and air dried to yield 3-ethoxy-6α-fluoro - 11β - hydroxy-16α,17α-isopropylidenedioxy-21-acetoxypregna-3,5-dien-20-one, which is recrystallized from acetone:hexane.

*Part B.*—A stream of perchloryl fluoride is passed through a solution of 1 g. of 3-ethoxy-6α-fluoro-11β-hydroxy - 16α,17α-isopropylidenedioxy-21-acetoxypregna-3,5-dien-20-one in 25 ml. of dimethylformamide, cooled to 20° C. for 95 minutes. After being allowed to slowly attain a temperature of 25° C., the solution is poured into water and extracted with ethyl acetate. These extracts are washed wih saturated aqueous sodium bicarbonate solution and with water to neutrality, dried over sodium sulfate and evaporated to dryness to yield 6α,6β-difluoro-11β-hydroxy - 16α,17α - isopropylidenedioxy-21-acetoxypregn - 4 - ene - 3,20 - dione, which is recrystallized from acetone:hexane.

Similarly, 6α,6β - difluoro - 11β - hydroxy-16α,17α-isopropylidenedioxy - 21 - acetoxypregn-4-ene-3,20-dione is obtained when 6β-fluoro-11β-hydroxy-16α,17α-isopropylidenedioxy-21-acetoxypregn-4-ene-3,20-dione is employed in the above processes of Example 1 as the 6-fluoro starting steroid.

*Part C.*—A mixture of 1 g. of 6α,6β-difluoro-11β-hydroxy - 16α,17α-isopropylidenedioxy-21-acetoxypregn-4-ene-3,20-dione, 50 ml. of t-butanol, 0.4 g. of recently sublimed selenium dioxide and 0.2 ml. of pyridine is refluxed under nitrogen for 48 hours, cooled and filtered through Celite diatomaceous earth. The filtrate is evaporated under reduced pressure and the residue dissolved in acetone. This solution is refluxed in the presence of charcoal for 1 hour, filtered through Celite diatomaceous earth and evaporated. The residue is then chromatographed on neutral alumina to yield 6α,6β-difluoro-11β-hydroxy - 16α,17α-isopropylidenedioxy-21-acetoxypregna-1,4-diene-3,20-dione.

By the method of the processes of Parts A and B

6α,6β,21-trifluoro-11β-hydroxy-16α,17α-isopropylidenedioxypregn-4-ene-3,20-dione;
6α,6β-difluoro-11β-hydroxy-16α,17α-isopropylidenedioxy-21-chloropregn-4-ene-3,20-dione;
6α,6β,9α,21-tetrafluoro-11β-hydroxy-16α,17α-isopropylidenedioxypregn-4-ene-3,20-dione;
6α,6β,9α-trifluoro-11β-hydroxy-16α,17α-isopropylidenedioxy-21-chloropregn-4-ene-3,20-dione;
6α,6β-difluoro-9α,11β-dichloro-16α,17α-isopropylidenedioxy-21-acetoxypregn-4-ene-3,20-dione;
6α,6β,21-trifluoro-9α,11β-dichloro-16α,17α-isopropylidenedioxypregn-4-ene-3,20-dione;
6α,6β-difluoro-9α,11β,21-trichloro-16α,17α-isopropylidenedioxypregn-4-ene-3,20-dione;
6α,6β,9α-trifluoro-11β,21-dihydroxy-16α,17α-isopropylidenedioxypregn-4-ene-3,20 dione and
6α,6β-difluoro-9α,11β-dichloro-16α,17α-isopropylidenedioxy-21-hydroxypregn-4-ene-3,20-dione are prepared from the corresponding 6α- or 6β-fluoro steroids.

By employing the above novel $\Delta^4$-6-gem-difluoro compounds as starting materials in the process of Part C, the following novel $\Delta^{1,4}$-6-gem-difluoro steroids are respectively prepared:

6α,6β,21-trifluoro-11β-hydroxy-16α,17α-isopropylidenedioxypregna-1,4-diene-3,20-dione;
6α,6β-difluoro-11β-hydroxy-16α,17α-isopropylidenedioxy-21-chloropregna-1,4-diene-3,20-dione;
6α,6β,9α,21-tetrafluoro-11β-hydroxy-16α,17α-isopropylidenedioxypregna-1,4-diene-3,20-dione;
6α,6β,9α-trifluoro-11β-hydroxy-16α,17α-isopropylidenedioxy-21-chloropregna-1,4-diene-3,20-dione;
6α,6β-difluoro-9α,11β-dichloro-16α,17α-isopropylidenedioxy-21-acetoxypregna-1,4-diene-3,20-dione;
6α,6β,9α-trifluoro-11β,21-dihydroxy-16α,17α-isopropylidenedioxypregna-1,4-diene-3,20-dione;
6α,6β-difluoro-9α,11β,21-trichloro-16α,17α-isopropylidenedioxypregna-1,4-diene-3,20-dione;
6α,6β,9α-trifluoro-11β,21-dihydroxy-16α,17α-isopropylidenedioxypregna-1,4-diene-3,20-dione and
6α,6β-difluoro-9α,11β-dichloro-16α,17α-isopropylidenedioxy-21-hydroxypregna-1,4-diene-3,20-dione are obtained.

EXAMPLE 2

The following compounds are prepared from the corresponding 6α- and/or 6β-fluoro steroids by employing the latter as starting materials in Part A of the process of Example 1, and subsequently employing the resulting 3-ethoxy-$\Delta^{3,5}$ steroids as starting materials in Part B of the process of Example 1:

6α,6β-difluoro-11β-hydroxy-16α,17α-(3',3'-pentylidenedioxy)-21-acetoxypregn-4-ene-3,20-dione;
6α,6β,9α-trifluoro-11β-hydroxy-16α,17α-(diphenylmethylenedioxy)-21-chloropregn-4-ene-3,20-dione;
6α,6β-difluoro-9α-chloro-11β-hydroxy-16α,17α-(cyclohexylidenedioxy)-21-acetoxypregn-4-ene-3,20-dione;
6α,6β,21-trifluoro-9α,11β-dichloro-16α,17α-(dicyclopentylidenedioxy)pregn-4-ene-3,20-dione;
6α,6β,9α,21-tetrafluoro-11β-hydroxy-16α,17α-cyclopentylidenedioxypregn-4-ene-3,20-dione;
6α,6β-difluoro-11β-hydroxy-16α,17α-(1'-thia-4',4'-cyclohexylidenedioxy oxide)-21-chloropregn-4-ene-3,20-dione;
6α,6β,9α-trifluoro-11β-hydroxy-16α,17α-(N-methyl-4',4'-piperidylidenedioxy)-21-chloropregn-4-ene-3,20-dione;
6α,6β-difluoro-9α,11β-dichloro-16α,17α-(4',4'-piperidylidenedioxy)-21-acetoxypregn-4-ene-3,20-dione;
6α,6β,9α-trifluoro-11β-hydroxy-16α,17α-(1'-thia-4',4'-cyclohexylidenedioxy)-21-acetoxypregn-4-ene-3,20-dione;
6α,6β-difluoro-11β-hydroxy-16α,17α-(4',4'-tetrahydropyranylidenedioxy)-21-acetoxypregn-4-ene-3,20-dione;

6α,6β,21-trifluoro-9α,11β-dichloro-16α,17α-(3',3'-hexylidenedioxy)pregn-4-ene-3,20-dione; and
6α,6β,21-trifluoro-11β-hydroxy-16α,17α-(1'-thia-4',4'-cyclohexylidenedioxy dioxide)pregn-4-ene-3,20-dione.

By employing the above novel 6-gem-difluoro steroids as starting materials in Part C of the process of Example 1 or Part C of the process of Example 3, the corresponding $\Delta^{1,4}$-6-gem-difluoro steroids are obtained.

EXAMPLE 3

Part A.—To a suspension of 1 g. of 6α,9α-difluoro-11β,17α - dihydroxy - 16α-methyl-21-chloropregn-4-ene 3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air-dried to yield 3-ethoxy-6α,9α-difluoro-11β,17α - dihydroxy-16α-methyl-21-chloropregna-3,5-dien-20-one, which is recrystallized from acetone:hexane.

Part B.—A stream of perchloryl fluoride is passed through a solution of 1 g. of 3-ethoxy-6α,9α-difluoro-11β,17α - dihydroxy - 16α - methyl-21-chloropregna-3,5-dien-20-one in 25 ml. of dimethylformamide, cooled to 0° C., for 5 minutes. After being allowed to slowly attain a temperature of 20° C., the solution is poured into water and extracted with ethyl acetate. These extracts are washed with a saturated aqueous sodium bicarbonate solution and then with water to neutrality, dried over sodium sulfate and evaporated to dryness to yield 6α,6β,9α-trifluoro - 11β,17α - dihydroxy - 16α - methyl-21-chloropregn-4-ene-3,20-dione, which is recrystallized from acetone:hexane.

Part C.—A mixture of 0.5 g. of 6α,6β,9α-trifluoro-11β,17α-dihydroxy-16α-methyl - 21 - chloropregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is filtered through 10 g. of alumina and concentrated to yield 6α,6β,9α-trifluoro-11β,17α-dihydroxy-16β-methyl-21-chloropregna-1,4-diene-3,20-dione.

Similarly, the following novel $\Delta^4$-6-gem-difluoro steroids are prepared from the corresponding $\Delta^4$-6α- or 6β-fluoro steroids:

6α,6β-difluoro-11β,17α-dihydroxy-16α-methyl-21-acetoxypregn-4-ene-3,20-dione;
6α,6β,21-trifluoro-11β,17α-dihydroxy-16α-methyl-pregn-4-ene-3,20-dione;
6α,6β-difluoro-11β,17α-dihydroxy-16α-methyl-21-chloropregn-4-ene-3,20-dione;
6α,6β,9α-trifluoro-11β,17α-dihydroxy-16α-methyl-21-acetoxypregn-4-ene-3,20-dione;
6α,6β,9α,21-tetrafluoro-11β,17α-dihydroxy-16α-methylpregn-4-ene-3,20-dione;
6α,6β,9α-trifluoro-11β,17α-dihydroxy-21-chloropregn-4-ene-3,20-dione;
6α,6β-difluoro-9α,11β-dichloro-16α-methyl-17α-hydroxy-21-acetoxypregn-4-ene-3,20-dione;
6α,6β,21-trifluoro-9α,11β-dichloro-16α-methyl-17α-hydroxypregn-4-ene-3,20-dione;
6α,6β-difluoro-9α,11β,21-trichloro-16α-methyl-17α-hydroxypregn-4-ene-3,20-dione;
6α,6β-difluoro-11β-hydroxy-16α-methyl-17α-valeryloxy-21-acetoxypregn-4-ene-3,20-dione; and
6α,6β,9α-trifluoro-11β-hydroxy-16α-methyl-17α-valeryloxy-21-acetoxypregn-4-ene-3,20-dione.

By employing the above novel $\Delta^4$-6-gem-fluoro steroids in the process of Part C the following novel $\Delta^{1,4}$-6-gem-fluoro steroids are respectively prepared:

6α,6β-difluoro-11β,17α-dihydroxy-16α-methyl-21-acetoxypregna-1,4-diene-3,20-dione;
6α,6β,21-trifluoro-11β,17α-dihydroxy-16α-methyl-pregna-1,4-diene-3,20-dione;
6α,6β-difluoro-11β,17α-dihydroxy-16α-methyl-21-chloropregna-1,4-diene-3,20-dione;
6α,6β,9α-trifluoro-11β,17α-dihydroxy-16α-methyl-21-acetoxypregna-1,4-diene-3,20-dione;
6α,6β,9α,21-tetrafluoro-11β,17α-dihydroxy-16α-methylpregna-1,4-diene-3,20-dione;
6α,6β,9α-trifluoro-11β,17α-dihydroxy-21-chloropregna-1,4-diene-3,20-dione;
6α,6β-difluoro-9α,11β-dichloro-16α-methyl-17α-hydroxy-21-acetoxypregna-1,4-diene,3,20-dione;
6α,6β,21-trifluoro-9α,11β-dichloro-16α-methyl-17α-hydroxypregna-1,4-diene-3,20-dione;
6α,6β-difluoro-9α,11β,21-trichloro-16α-methyl-17α-hydroxypregna-1,4-diene-3,20-dione;
6α,6β-difluoro-11β-hydroxy-16α-methyl-17α-valeryloxy-21-acetoxypregna-1,4-diene-3,20-dione; and
6α,6β,9α-trifluoro-11β-hydroxy-16α-methyl-17α-valeryloxy-21-acetoxypregna-1,4-diene-3,20-dione.

EXAMPLE 4

The following 6-gem-difluoro steroids are prepared via the methods of Steps A and B of Example 3 from the corresponding 6-fluoro steroids:

6α,6β-difluoro-11β,17α-dihydroxy-21-acetoxy-pregn-4-ene-3,20-dione;
6α,6β-difluoro-9α,11β-dichloro-17α-valeryloxy-21-acetoxypregn-4-ene-3,20-dione;
6α,6β-difluoro-11β-hydroxy-17α-valeryloxy-21-chloropregn-4-ene-3,20-dione;
6α,6β,9α,21-tetrafluoro-11β-hydroxy-17α-valeryloxy-pregn-4-ene-3,29-dione;
6α,6β-difluoro-9α,11β-dichloro-17α-valeryloxy-16α-methyl-21-acetoxypregn-4-ene-3,20-dione;
6α,6β-difluoro-11β-hydroxy-16β-methyl-21-caproxy-pregn-4-ene-3,20-dione;
6α,6β,9α-trifluoro-11β,17α-dihydroxy-16β-methyl-21-(tetrahydrofuran-2'-yloxy)pregn-4-ene-3,20-dione;
6α,6β-difluoro-11β-hydroxy17α,21-diacetoxypregn-4-ene-3,20-dione;
6α,6β,9α-trifluoro-11β,17α-dihydroxy-21-chloro-pregn-4-ene-3,20-dione;
6α,6β,21-trifluoro-9α,11β-dichloro-16β-methyl-17α-hydroxypregn-4-ene-3,20-dione;
6α,6β,9α-trifluoro-11β,17α-dihydroxy-21-chloro-pregn-4-ene-3,20-dione;
6α,6β,21-trifluoro-9α,11β-dichloro-17α-hydroxy-pregn-4-ene-3,20-dione;
6α,6β-difluoro-11β,17α-dihydroxy-21-acetoxypregn-4-ene-3,20-dione; and
6α,6β,difluoro-9α,11β-dichloro-17α,21-diacetoxy-pregn-4-ene-3,20-dione.

By employing the above 6-gem-difluoro-$\Delta^4$ steroids as starting materials in the process of Part C of Example 3, the corresponding 6-gem-difluoro-$\Delta^{1,4}$ steroids are prepared.

EXAMPLE 5

A suspension of 1 g. of 6α,6β,9α-trifluoro-11β,17α-dihydroxy-21-acetoxypregna-1,4-diene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 6α,6β,9α-trifluoro - 11β,17α,21 - trihydroxypregna-1,4-diene - 3,20-dione, which is recrystallized from acetone:hexane.

Similarly, the other 21-acyloxy-6-gem-difluoro steroids prepared in accordance with the processes of Examples 1 and 3, or named in Examples 1–4 can be hydrolyzed to afford the corresponding 21-hydroxy compounds.

11

EXAMPLE 6

Part A.—To a mixture of 1 g. of 6α,6β-difluoro-9α,11β-dichloro-17α,21-dihydroxypregna - 1,4 - diene-3,20-dione and 10 ml. of anhydrous peroxide free dioxane is added 4 g. of methyl ortho valerylate and 0.5 g. of p-toluenesulfonic acid. The mixture is heated at 100° C. for a period of 2 hours; then it is cooled and 1 ml. of pyridine is added, followed by the addition of 100 ml. of water. The resulting solid is collected by filtration, washed with water, and dried to yield 6α,6β-difluoro-9α,11β-dichloro - 17α,21-(1'-methoxy-1',1'-pentylidenedioxy)-pregna - 1,4-diene-3,20-dione, which is recrystallized from acetone:hexane.

Part B.—A solution of 1.5 g. of 6α,6β-difluoro-9α,11β-dichloro - 17α,21 - (1'-methoxy-1',1'-pentylidenedioxy) pregna - 1,4 - diene-3,20-dione and 40 ml. of methanol and 30 ml. of 2 N oxalic acid are heated at 40° C. for 10 minutes. The reaction mixture is evaporated under reduced pressure, and the resulting residue is crystallized from methanol to yield 6α,6β-difluoro-9α,11β-dichloro-17α-valeryloxy-21-hydroxyprega-1,4-diene-3,20-dione.

Similarly, 6α,6β - difluoro-9α,11β-dichloro-17α-acetoxy-21 - hydroxypregna - 1,4-diene-3,20-dione; 6α,6β-difluoro-9α,11β-dichloro - 17α - butyryloxy-21-hydroxypregna-1,4-diene-3,20 - dione; and 6α,6β - difluoro-9α,11β-dichloro-17α-caproyloxy - 21 - hydroxypregna-1,4 - diene-3,20-dione are prepared by using methyl ortho acetate, methyl ortho butyrate and methyl ortho caproate in the above process.

EXAMPLE 7

A mixture of 1 g. of 6α,6β,9α - trifluoro-11β,21-dihydroxy - 16α,17α - isopropylidenedioxypregna - 1,4-diene-3,20-dione, 4 ml. of pyridine and 7 ml. of caproic anhydride is allowed to stand at room temperature for 15 hours. The mixture is then poured into ice water and the solid which forms in collected by filtration, washed with water and dried to yield 6α,6β,9α-trifluoro-11β-hydroxy-16α,17α - isopropylidenedioxy - 21 - caproyloxypregna-1,4 - diene-3,20-dione, which may be further purified through recrystallization from acetone:hexane.

EXAMPLE 8

Part A.—To a suspension of 1 g. of 6α-fluoro-17α-ethynyl - 17β - hydroxyestr-4-en-3-one in 7.5 ml. of anhydrous, peroxide free dioxane added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is then added 0.8 ml. of pyridine, followed by water until solidification occurs. This solid is collected by filtration, washed with water and air dried to yield 3 - ethoxy - 6α - fluoro-17α-ethynylestra-3,5-dien-17β-ol, which is recrystallized from acetone:hexane.

Part B.—A stream of perchloryl fluoride is passed through a solution of 1 g. of 3 - ethoxy-6α-fluoro-17α-ethynylestra - 3,5 - dien - 17β-ol in 25 ml. of dimethylformamide, cooled to 20° C. for 95 minutes. After being allowed to slowly attain a temperature of 25° C., the solution is poured into water and extracted with ethyl acetate. These extracts are washed with saturated aqueous sodium bicarbonate solution and with water to neutrality, dried over sodium sulfate and evaporated to dryness to yield 6α,6β - difluoro - 17α - ethynyl-17β-hydroxyestr-4-en-3-one, which is recrystallized from acetone:hexane.

Similarly, 6α,6β - difluoro - 17α - acetoxypregn-4-ene-3,20 - dione and 6α,6β-difluoro-17α-ethynyl-17β-acetoxyandrost - 4 - en-3-one are prepared from 6α - fluoro-17α- acetoxypregn - 4 - ene - 3,20 - dione and 6 - fluoro-17α-ethynyl - 17β - acetoxyandrost - 4 - en-3-one respectively by the processes of Parts A and B of the above process.

What is claimed is:

1. The compounds of the formula:

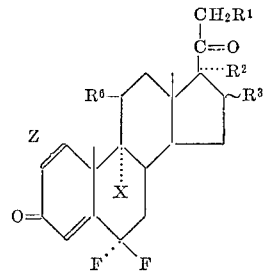

wherein:

$R^1$ is hydroxy, fluoro, chloro or a conventional hydrolyzable ester;

$R^2$ is hydrogen, hydroxy, or a conventional hydrolyzable ester;

$R^3$ is hydrogen or methyl;

$R^2$ and $R^3$ when taken together are the group

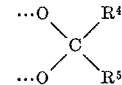

where each of $R^4$ and $R^5$ is, independently of each other, hydrogen, lower alkyl, halogenated lower alkyl, monocyclic cycloalkyl, monocyclic cycloalky lower alkyl, monocyclic aryl, monocyclic aryl lower alkyl, monocyclic heterocyclic, monocyclic heterocyclic lower alkyl; or $R^4$ and $R^5$ together with the carbon atom to which they are joined are monocyclic cycloalkylidene or monocyclic heterocyclic ylidene;

$R^6$ is hydroxy or chloro;

X is hydrogen, fluoro or chloro, provided that each of $R^6$ and X is chloro when $R^6$ is chloro; and Z is a carbon-carbon single bond or a carbon-carbon double bond.

2. The compounds according to claim 1:

$R^1$ is hydroxy, fluoro, chloro or acetoxy;

$R^2$ is hydrogen, hydroxy, acetoxy, or valeryloxy;

$R^3$ is hydrogen or methyl;

$R^2$ and $R^3$ when taken together are the group

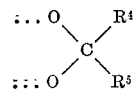

where each of $R^4$ and $R^5$ is, independently of each other, methyl, ethyl, propyl or butyl; or $R^4$ and $R^5$ taken together with the carbon atom to which they are joined are cyclopentylidene, cyclohexylidene, 4',4' - tetrahydropyranylidene, 4',4'-piperidylidene, N - methyl-4',4'-piperidylidene, N-ethyl,4',4' - piperidylidene, 1'-thia - 4',4'-cyclohexylidene, 1' - thia - 4',4' - cyclohexylidene oxide or 1'-thia-4',4'-cyclohexylidene dioxide; and $R^6$ and X are as defined in claim 1.

3. The compounds according to claim 2 which are 6α,6β - difluoro - 11β,17α,21 - trihydroxy - 16α-methylpregna - 1,4 - diene-3,20-dione and the 21-acetate ester thereof.

4. The compound according to claim 2 which is 6α,6β,21 - trifluoro - 11β,17α - dihydroxy - 16α-methylpregna-1,4-diene-3,20-dione.

5. The compound according to claim 2 which is 6α,6β-difluoro - 11β,17α-dihydroxy-16α-methyl-21-chloropregna-1,4-diene-3,20-dione.

6. The compounds according to claim 2 which are 6α,6β,9α-trifluoro - 11β,17α,21 - trihydroxy-16α-methylpregna-1,4-diene-3,20-dione and the 21-acetate ester thereof.

7. The compound according to claim 2 which is 6α,6β,9α,21-tetrafluoro - 11β,17α - dihydroxy-16α-methylpregna-1,4-diene-3,20-dione.

8. The compound according to claim 2 which is 6α,6β,9α - trifluoro - 11β,17α - dihydroxy-16α-methyl-21-chloropregna-1,4-diene-3,20-dione.

9. The compounds according to claim 2 which are 6α,6β-difluoro - 11β,21 - dihydroxy-16α,17α-isopropylidenedioxypregna-1,4-diene-3,20-dione, and the 21-acetate ester thereof.

10. The compound according to claim 2 which is 6α,6β,21-trifluoro-11β-hydroxy - 16α,17α - isopropylidenedioxypregna-1,4-diene-3,20-dione.

11. The compound according to claim 2 which is 6α,6β-difluoro-11β-hydroxy - 16α,17α - isopropylidenedioxy-21-chloropregna-1,4-diene-3,20-dione.

12. The compounds according to claim 2 which are 6α,6β,9α-trifluoro - 11β,21 - dihydroxy-16α,17α-isopropylidenedioxypregna-1,4-diene - 3,20 - dione and the 21-acetate ester thereof.

13. The compound according to claim 2 which is 6α,6β,9α,21-tetrafluoro - 11β - hydroxy-16α,17α-isopropylidenedioxypregna-1,4-diene-3,20-dione.

14. The compound according to claim 2 which is 6α,6β,9α-trifluoro-11β-hydroxy - 16α,17α - isopropylidenedioxy-21-chloropregna-1,4-diene-3,20-dione.

15. The compounds according to claim 2 which are 6α,6β - difluoro - 9α,11β - dichloro-17α,21-dihydroxy-16α-methylpregna - 1,4 - diene-3,20-dione and the 21-acetate ester thereof.

16. The compound according to claim 2 which is 6α,6β,21-trifluoro - 9α,11β - dichloro-17α-hydroxy-16α-methylpregna-1,4-diene-3,20-dione.

17. The compound according to claim 2 which is 6α,6β-difluoro - 9α,11β,21 - trichloro-17α-hydroxy-16α-methylpregna-1,4-diene-3,20-dione.

18. The compounds according to claim 2 which are 6α,6β-difluoro - 9α,11β - dichloro-16α,17α-isopropylidenedioxy-21-hydroxypregna-1,4-diene-3,20-dione and the 21-acetate ester thereof.

19. The compound according to claim 2 which is 6α,6β,21-trifluoro - 9α,11β - dichloro-16α,17α-isopropylidenedioxypregna-1,4-diene-3,20-dione.

20. The compound according to claim 2 which is 6α,6β-difluoro - 9α,11β,21 - trichloro-16α,17α-isopropylidenedioxypregna-1,4-diene-3,20-dione.

21. The compounds according to claim 2 wherein:

$R^2$ is acetoxy or valeryloxy;
$R^3$ is methyl; and
$R^1$, $R^6$, X and Z are as defined in claim 2.

22. The compounds according to claim 21 which are 6α,6β-difluoro - 11β,21 - dihydroxy-17α-valeryloxy-16α-methylpregna-1,4-diene - 3,20 - dione and the 21-acetate ester thereof.

23. The compounds according to claim 21 which are 6α,6β,9α-trifluoro - 11β,21 - dihydroxy-17α-valeryloxy-16α-methylpregna-1,4-diene-3,20-dione and the 21-acetate ester thereof.

References Cited

UNITED STATES PATENTS

| | | | |
|---|---|---|---|
| 3,264,332 | 8/1966 | Gould et al. | 260—397.45 |
| 3,282,969 | 11/1966 | Boswell | 260—397.3 |

OTHER REFERENCES

Nakanishi et al.: J.A.C.S. vol. 81, pp. 5259–60.

HENRY A. FRENCH, Primary Examiner

U.S. Cl. X.R.

195—51; 260—397.3, 397.4, 397.45, 397.5, 999